United States Patent

[11] 3,628,801

| [72] | Inventor | Anne Lambrecht<br>Box 88, Ceylon, Saskatchewan, Canada |
| --- | --- | --- |
| [21] | Appl. No. | 29,952 |
| [22] | Filed | Apr. 20, 1970 |
| [45] | Patented | Dec. 21, 1971 |

[54] TOY ANIMAL TRICYCLE
4 Claims, No Drawings

[52] U.S. Cl. ................................................ 280/1.202,
280/1.206
[51] Int. Cl. ..................................................... A63g 17/00
[50] Field of Search........................................... 280/1.22,
1.201, 1.202, 1.208, 1.192, 1.195

[56] References Cited
UNITED STATES PATENTS

| 1,270,169 | 6/1918 | Kester | 280/1.208 X |
| --- | --- | --- | --- |
| 2,815,219 | 12/1957 | Martinez | 280/1.202 |
| 2,617,658 | 11/1952 | James et al. | 280/1.189 |
| 2,212,781 | 8/1940 | La Bille | 280/1.196 |
| 1,385,883 | 7/1921 | Morgan | 280/1.206 X |
| 3,514,117 | 5/1970 | Olsen | 280/1.192 |

*Primary Examiner*—Leo Friaglia
*Attorney*—Kent & Ade

ABSTRACT: An animal such as a horse is moulded over a frame which has a pair of rear wheels and a steerable front wheels. Turning the handle bars pulls on the reins and turns the head together with the front wheel.

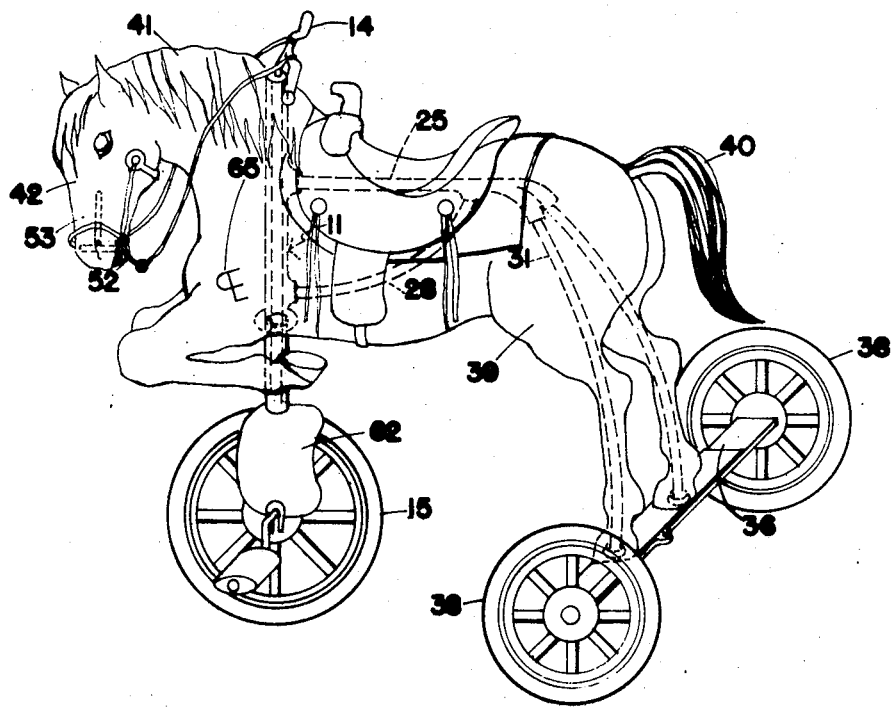

INVENTOR.
ANNE LAMBRECHT

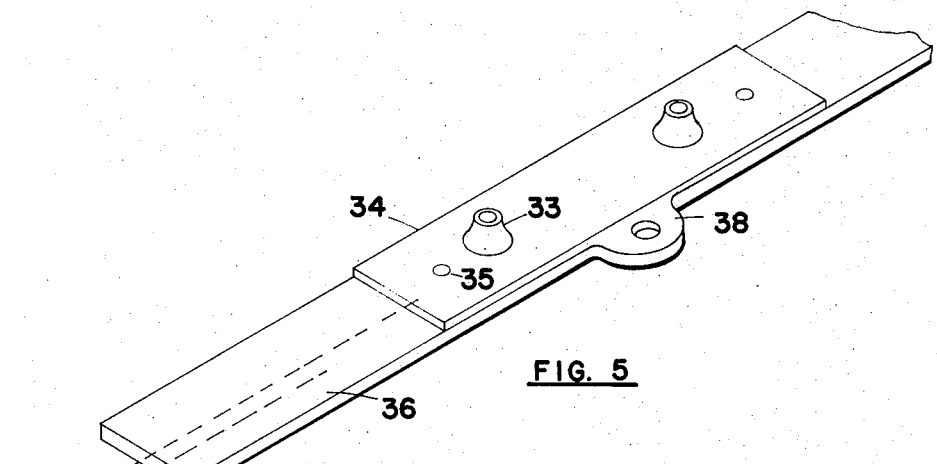
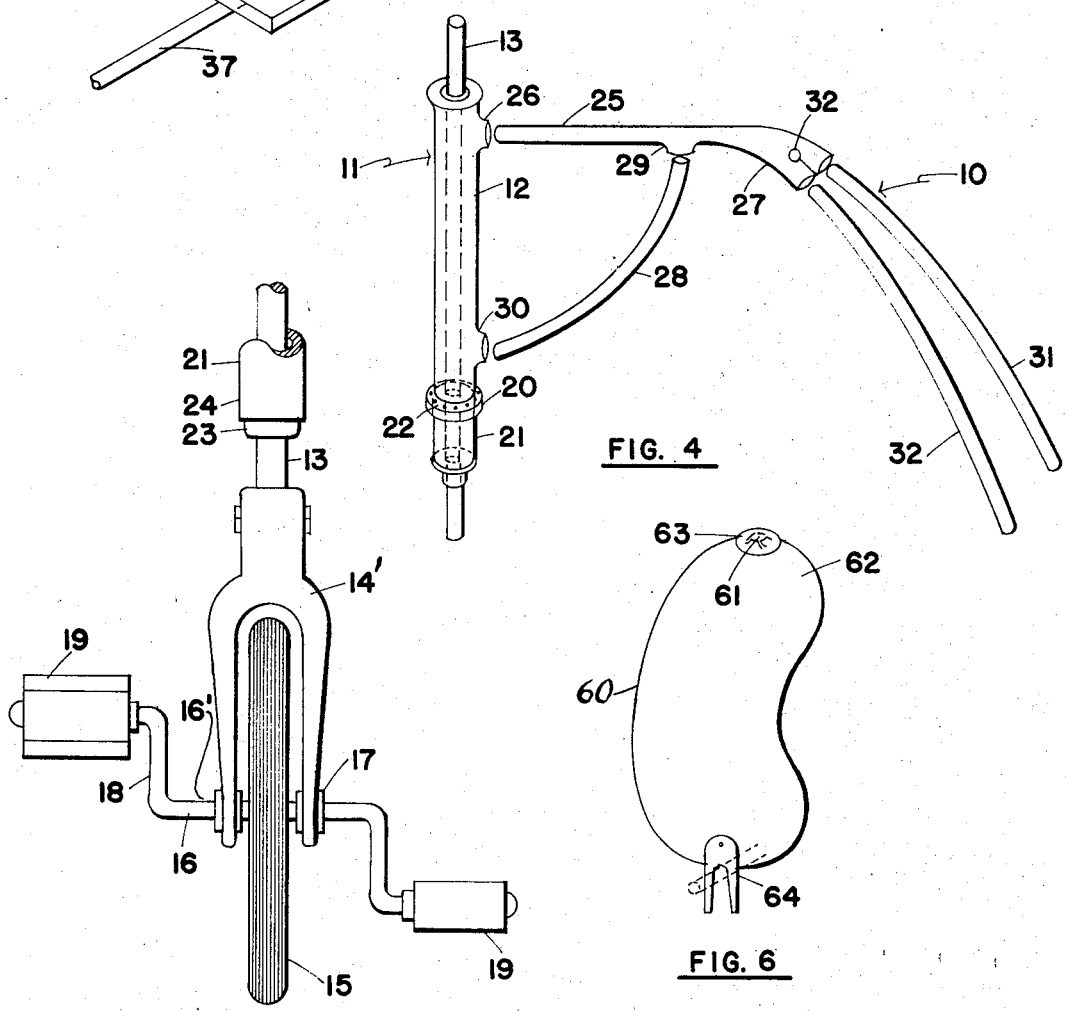

3,628,801

TOY ANIMAL TRICYCLE

This invention relates to new and useful improvements in toy animal tricycles, particularly toy horse type animal tricycles.

It is well known that toy animals have a fascination for children, particularly toy horses and the well known hobby horse is an example of an attempt to provide a toy which can be used by a child. However, such hobby horse are not wheel mounted.

Tricycles are also well known but are difficult to decorate so that they appear as anything but a tricycle.

The present invention provides a combination toy animal and tricycle in which the animal is molded directly over a novel framework so that the child in effect is riding a wheel mounted animal by pedaling the front wheel in a manner similar to propelling a tricycle.

Although the drawings and description refer to a toy horse, nevertheless it will of course be appreciated that any form of animal can be mounted to this novel frame.

The principle object and essence of the invention is therefore to provide a device of the character herewithin described which is a combination toy animal and tricycle-type vehicle.

Another object of the invention is to provide a device of the character herewithin described which includes a novel means for mounting the head of the animal to the body and connecting same to the handle bars so that the head turns at the same time as the handle bars are turned.

A yet further object of the invention is to provide a device of the character herewithin described in which the animal body can be fully decorated and provided with such things as saddles, reins and the like.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement of combination of parts, or new use of any of the foregoing, of which concept, one or more specific embodiments of same are herein exemplified as illustrative only of such concept, reference being had to the accompanying figures in which:

FIG. 4 is an isometric view of the frame per se.

FIG. 5 is an isometric, fragmentary view of the rear step.

FIG. 6 is an isometric view of one of the front wheel fenders.

FIG. 7 is a front elevation of the front wheel assembly per se.

In the drawings like characters of reference indicate corresponding parts in the different figures.

Figure 1:
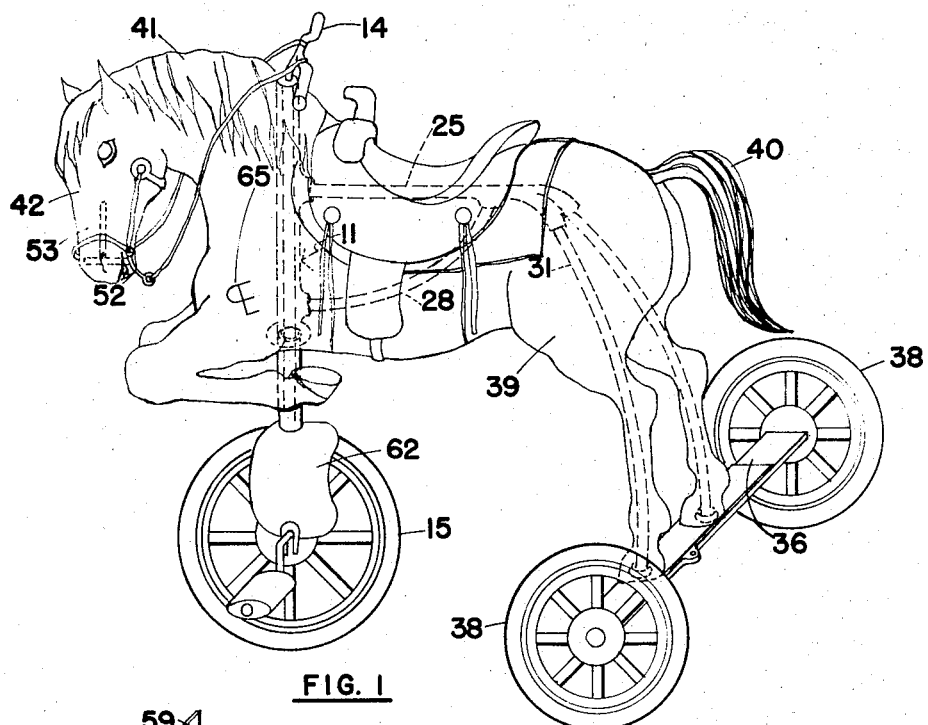
FIG. 1 is an isometric view of the invention.

Proceeding therefore to describe the invention in detail, reference character 10 illustrates generally the frame of the device.

This frame includes a steering post assembly collectively designated 11 which in turn consists of a vertically situated tube 12 having a steering post 13 concentrically mounted therethrough for rotation therein. Handlebars 14 are secured to the upper end of the steering post 13 and a front wheel fork assembly 14' is secured to the lower end of this post 13 in the conventional manner.

A front wheel 15 is mounted upon an axle 16 which in turn is journaled for rotation within bearings 17 secured within the aforementioned 14'.

Pedal cranks 18 form extensions to the axle 16 upon each side thereof and conventional foot pedals 19 are secured for rotation upon the ends of the pedal cranks 18.

A flange or plate 20 extends around the base of the tube 12 and a further relatively short tube 21 is in turn secured to this flange by crimping 22. A stop 23 surrounds the shaft 13 and is secured thereto and the lower end 24 of the tube 21 bears upon this stop.

A horizontal saddle support bar 25 is socketed to adjacent the upper end of the steering post assembly tube 12 into socket 26 and extends rearwardly to terminate in a bifurcated socket rear end 27.

A diagonal member 28 is socketed to the underside of the horizontal tube 25 as at 29 and to a further socket 30 adjacent the lower end of tube 12 as clearly shown in FIG. 4.

A pair of leg bars 31 engage the aforementioned bifurcated sockets 27 of the horizontal bar 25 and are secured therein by means of bolts and nut assemblies 32.

These leg bars curve downwardly and outwardly as clearly shown and the lower ends 32' engage over upstanding shoulders 33 formed on the upper surface of an attaching plate 34.

This plate in turn is bolted by means of nut and bolt assemblies 35, to a rear step plate 36 which extends transversely as shown in FIGS. 1 and 5. The step plate has secured to the underside thereof, an axle 37 and rear ground-engaging wheels 38 are journaled for rotation upon the ends of this axle 37.

An apertured portion 38' forms an extension of the step plate centrally thereof for the attachment thereto of a wagon or similar device which may be towed by the present invention.

Molded over the framework is an animal body such as a horse 39 and it is preferable that this body be made of soft latex and colored and decorated to imitate the real animal as closely as possible. It may be provided with a tail 40 and a mane 41.

The head 42, in this case a horse's head, is secured to the body by means of a relatively closely packed coil spring member 43 the ends 44 of which are molded integrally with the head and with the body, it being understood that this coil spring member 43 is also covered with the soft latex or body material so that it does not show. However, it does permit the head to be moved relative to the body within limits.

Figure 3:
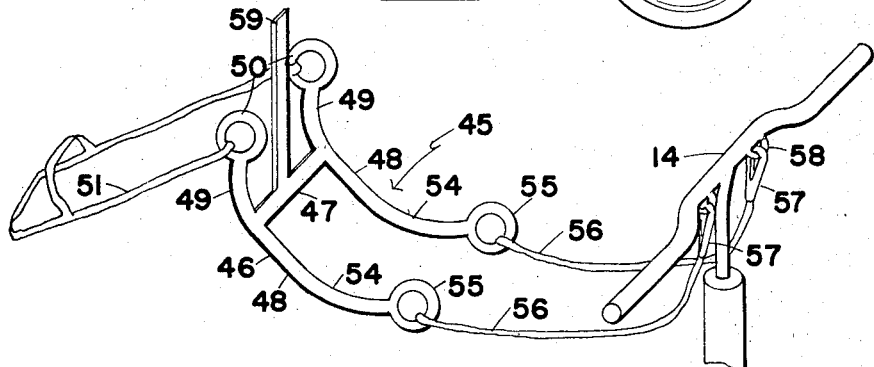
FIG. 3 is an isometric view of the rein and bridle assembly.
Figure 2:
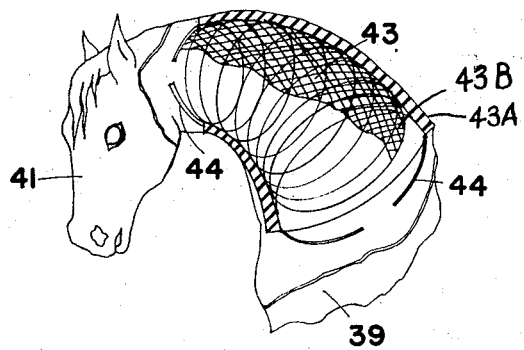
FIG. 2 is a side elevation of the head showing the connection to the body, sectioned in part to show the interior thereof.

I provide a bridle and rein assembly collectively designated 45 and shown in detail in FIG. 3. It consists of a metal attaching element 46 consisting of a crossbar 47 and a pair of side members 48. The front ends 49 of the side members terminate in rings 50 and a bridle assembly 51 is secured by the ends thereof to these rings and extends around the mouth 52 of the animal and over the nose 53 thereof in the conventional manner.

The rear ends 54 of the member 46 are provided with rings 55 into which are attached reins 56, it being understood that one rein passes rearwardly upon each side of the neck of the animal. The reins are provided with snaps 57 upon the rear ends thereof and these snaps enable the reins to be detachably secured to rings 58 formed or secured to the handlebars 14 upon each side thereof.

It will therefore be appreciated that by turning the handle bars 14 in order to turn the front wheel 15, will cause the reins 56 to initiate side to side movement of the head corresponding to the turn of the handlebars and front wheel. The element 47 is provided with an upstanding post 59 which is molded or otherwise secured integrally within the underside of the head. The element 47 engages with the mount and the post 59 extending upwardly and rearwardly therefrom.

Fenders 60 similar to saddle fenders, are secured upon each side of the front wheel 15 by means of an aperture 61 formed in the upper end 62 thereof and a spring-type washer 63 which enables the fenders to be engaged over the lower end of the steering shaft 13 and to be held by the spring action of the washers A fork 64 is secured to the lower end of the fenders and enables the lower ends of the fenders to be secured to the horizontal portions 16' of the front wheel spindle 16 one upon each side of the fork 14'.

The wheels and animal may be decorated as desired, and a brand such as that shown by reference character 64 may also be imprinted or otherwise placed upon the outside of the animal body.

A heavy rubber sleeve 43A surrounds the spring 43 and a plastic mesh 43B covers the spring between the spring and the sleeve 43A. The rubber of the sleeve 43A should be somewhat slack (not illustrated) on each side of the head. This permits the head to be moved from side to side and the fact that this rubber is tighter and slightly thicker on the upper and lower sides assists in keeping the head in position, yet does give some nodding characteristics.

Various modifications can be made within the scope of the inventive concept which is herein disclosed and/or claimed.

What I claim as my invention is:

1. A toy animal tricycle comprising in combination a frame, said frame including a steering post assembly, a substantially horizontal saddle support bar extending rearwardly from adjacent the upper end of said steering post assembly, and a pair of leg bars inclining downwardly and outwardly from the rear end of said saddle support bar, a ground-engaging wheel rotatably mounted on the lower end of each of said leg bars, and a front ground-engaging wheel rotatably mounted on the lower end of said steering assembly, and an animal body molded over said frame, said animal body including a head, said head being mounted for side to side movement to said body, handlebars on the upper end of said steering post assembly connected to said front wheel for steering same, and a rein and bridle assembly operatively connected between the mount of the head and the handlebars whereby movement of said handlebars initiates movement in said head, said rein and bridle assembly including an attaching element, said element including means securing said element to said head, bridle-attaching loops on one end of said element and upon each side thereof, rein-attaching means on the other end of said element and also upon each side thereof, a rein secured by one end thereof to said rein securing means and means cooperating between the other ends of said reins and said handlebars to detachably secure said reins to said handlebars.

7. The device according to claim 1, in which said head includes a flexible springlike element secured by one end thereof to said head and by the other end thereof to said body whereby said head can move relative to said body but within limits.

3. The device according to claim 2, in which said rein and bridle assembly includes an attaching element, said element including means securing said element to said head, bridle attaching loops on one end of said element and upon each side thereof, rein-attaching means on the other end of said element and also upon each side thereof, a rein secured by one end thereof to said rein securing means and means cooperating between the other ends of said reins and said handlebars to detachably secure said reins to said handlebars.

4. A toy animal tricycle including a frame, rear wheels and a front steerable wheel and an animal body molded over said frame, said body including a head, said head being mounted for side to side movement to said body, handlebars associated with said front wheel for steering same and a rein and bridle assembly operatively connected between the mouth of the head and the handlebars whereby movement of said handlebars initiates movement in said head, said rein and bridle assembly including an attaching element, said element including means securing said element to said head, bridle-attaching loops on one end of said element and upon each side thereof, rein-attaching means on the other end of said element and also upon each side thereof, a rein secured by one end thereof to said rein-securing means and means cooperating between the other ends of said reins and said handle bars to detachably secure said reins to said handlebars.

* * * * *